US012595868B2

(12) United States Patent
Morimura et al.

(10) Patent No.: US 12,595,868 B2
(45) Date of Patent: Apr. 7, 2026

(54) ATTACHMENT DEVICE AND ATTACHMENT METHOD OF INFORMATION ACQUISITION DEVICE

(71) Applicant: Kubota Corporation, Osaka (JP)

(72) Inventors: Masaru Morimura, Amagasaki (JP); Maiko Nishino, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 22 days.

(21) Appl. No.: 18/952,025

(22) Filed: Nov. 19, 2024

(65) Prior Publication Data

US 2025/0075838 A1 Mar. 6, 2025

Related U.S. Application Data

(63) Continuation of application No. PCT/JP2023/015460, filed on Apr. 18, 2023.

(30) Foreign Application Priority Data

May 20, 2022 (JP) ................................. 2022-082737

(51) Int. Cl.
*F16L 41/06* (2006.01)
*F16L 41/00* (2006.01)

(52) U.S. Cl.
CPC .............. *F16L 41/06* (2013.01); *F16L 41/008* (2013.01)

(58) Field of Classification Search
CPC ......... F16L 41/04; F16L 41/045; F16L 41/06; F16L 41/065
See application file for complete search history.

(56) References Cited

U.S. PATENT DOCUMENTS 5,435,340 A * 7/1995 Tabuchi ................ F16L 47/345
251/266

FOREIGN PATENT DOCUMENTS

| JP | 6362754 | U | 4/1988 |
|----|---------|---|--------|
| JP | H0365094 | U | 6/1991 |
| JP | 2003254489 | A | 9/2003 |
| JP | 2016217518 | A | 12/2016 |
| KR | 101285706 | B1 | 7/2013 |
| KR | 101706762 | B1 | 2/2017 |

OTHER PUBLICATIONS

International Search Report in PCT/JP2023/015460, mailed Jul. 4, 2023, 3 pages.

* cited by examiner

*Primary Examiner* — Daphne M Barry
(74) *Attorney, Agent, or Firm* — Keating & Bennett, LLP

(57) ABSTRACT

An attachment device that is capable of forming a through hole in an outer peripheral surface of a pipe using a drilling machine and attaches an information acquisition device to acquire information regarding the pipe through the through hole, includes a pipe attachment portion attachable to the pipe and including an opening communicating with the through hole, a valve portion attached so as to communicate with the opening, a valve connection portion to connect the opening and the valve portion, and an attachment portion to which the drilling machine or the information acquisition device can be attached.

8 Claims, 11 Drawing Sheets

Fig. 6A
Fig. 6B
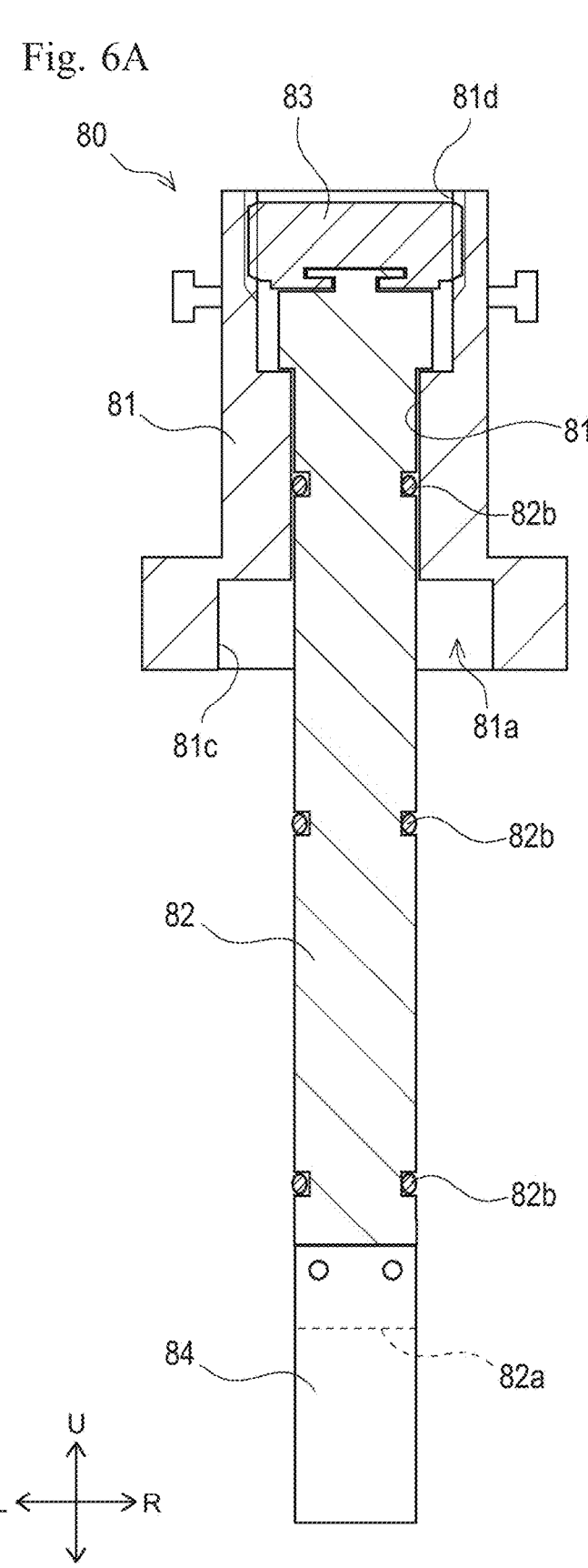
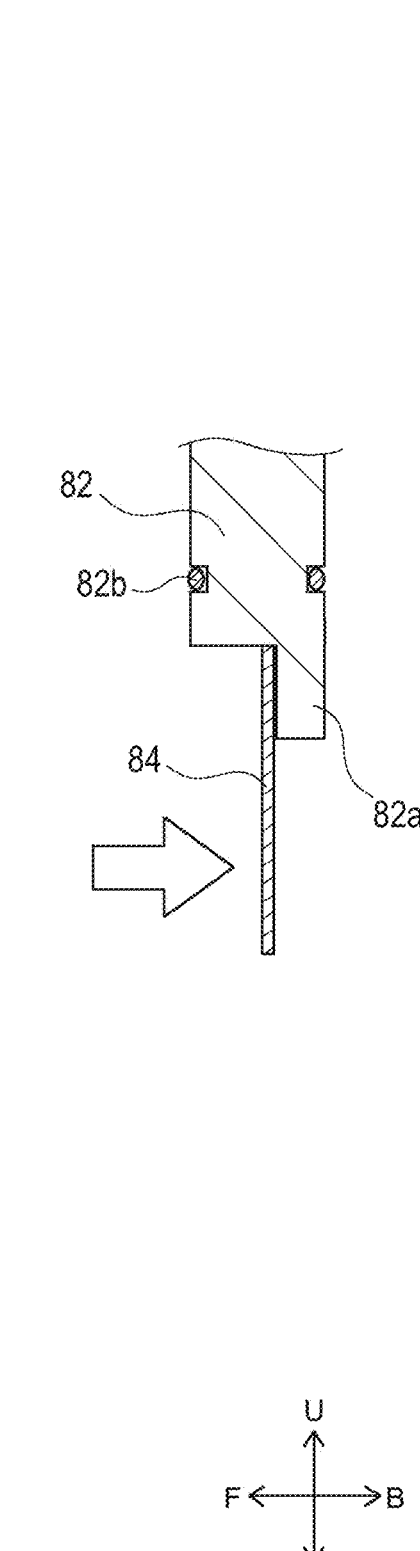

ATTACHMENT DEVICE AND ATTACHMENT METHOD OF INFORMATION ACQUISITION DEVICE

CROSS REFERENCE TO RELATED APPLICATIONS

This application claims the benefit of priority to Japanese Patent Application No. 2022-082737 filed on May 20, 2022 and is a Continuation Application of PCT Application No. PCT/JP2023/015460 filed on Apr. 18, 2023. The entire contents of each application are hereby incorporated herein by reference.

BACKGROUND OF THE INVENTION

1. Field of the Invention

The present invention relates to attachment devices capable of attaching information acquisition devices to acquire information regarding a pipe through which a fluid flows, and attachment methods of information acquisition devices.

2. Description of the Related Art

Conventionally, a technique of a device that acquires information regarding a pipe is known. For example, JP S63-62754 U discloses an uninterrupted water pipe investigation device in which an investigation rod for investigating the inside of a pipe can be inserted into a hole formed in the middle of a pipeline. The investigation rod is attached to a through flange provided to communicate with the hole.

Here, in a case where a hole through which the investigation rod can be inserted is not formed in an existing pipe (pipeline), it is necessary to form the hole in the pipe. For example, JP 2016-217518 A discloses a technique of forming a hole in a pipe (water pipe) using a drilling device. In the invention described in JP 2016-217518 A, a step of attaching a drilling device to a branch joint externally fixed to a pipe and drilling a hole in the pipe is executed.

As described above, a hole is formed in the pipe by the step described in JP 2016-217518 A, and the investigation rod described in JP S63-62754 U is inserted into the hole, whereby information on an arbitrary location of the pipe can be acquired.

However, in the case of forming the hole in the pipe or performing work of installing an information acquisition device as described above, it is necessary to replace a jig for attaching the drilling device and the information acquisition device to the pipe. Therefore, it is expected that installation work of the information acquisition device at an arbitrary location of the pipe becomes complicated.

SUMMARY OF THE INVENTION

In view of the above circumstances, example embodiments of the present invention provide attachment devices each capable of easily installing an information acquisition device at an arbitrary location in a pipe, and attachment methods of the information acquisition devices.

An attachment device according to an example embodiment of the present disclosure is capable of forming a first through hole in an outer peripheral surface of a pipe using a drilling machine and attaches an information acquisition device to acquire information regarding the pipe through the first through hole, the attachment device including a pipe attachment portion attachable to the pipe and including an opening communicating with the first through hole, a valve portion attached so as to communicate with the opening, a first valve connection portion connecting the opening and the valve portion, an attachment portion to which the drilling machine or the information acquisition device can be attached, and a second valve connection portion connecting the valve portion and the drilling machine or the information acquisition device, wherein the second valve connection portion includes a first main body that is tubular and insertable into a second through hole in the valve portion and the drilling machine or the information acquisition device, and a first elastic portion on an outer peripheral surface of the first main body to seal between the outer peripheral surface of the first main body and an inner peripheral surface of the second through hole, and the first main body is connectable to the drilling machine or the information acquisition device by being inserted into the second through hole so as to be pushed against a frictional force of the first elastic portion.

According to an example embodiment of the present disclosure, the information acquisition device can be easily installed at an arbitrary location of the pipe.

A valve connection portion according to an example embodiment of the present disclosure includes a second main body that is tubular, and a second elastic portion on an outer peripheral surface of the second main body to seal between the outer peripheral surface of the second main body and an inner peripheral surface of the opening.

According to an example embodiment of the present disclosure, it is possible to stop water in the pipe in a relatively space-saving manner.

An attachment portion according to an example embodiment of the present disclosure includes an abutment portion to abut against the valve portion on a plane orthogonal to a central axis of the opening.

According to an example embodiment of the present disclosure, centering of the valve portion with respect to the opening of the pipe attachment portion can be easily performed.

An information acquisition device according to an example embodiment of the present disclosure includes an information acquirer to acquire information regarding the pipe, a shaft portion to which the information acquirer is attachable, and an operator to insert the shaft portion into the through hole.

According to an example embodiment of the present disclosure, since the information acquirer can be installed inside the pipe via the through hole, information regarding the pipe can be directly acquired.

An attachment method of an information acquisition device according to an example embodiment of the present disclosure is an attachment method of an information acquisition device using the attachment device according to another example embodiment of the present disclosure described above, the attachment method including attaching the drilling machine to the attachment device attached to the pipe, forming the first through hole in the pipe using the drilling machine after the attaching the drilling machine, and detaching the drilling machine from the attachment device and attaching the information acquisition device to the attachment device after the forming the first through hole.

According to an example embodiment of the present disclosure, an information acquisition device can be easily installed at an arbitrary location of the pipe.

According to example embodiments of the present disclosure, information acquisition devices can each be easily installed at an arbitrary location of the pipe.

The above and other elements, features, steps, characteristics and advantages of the present invention will become more apparent from the following detailed description of the example embodiments with reference to the attached drawings.

BRIEF DESCRIPTION OF THE DRAWINGS

FIG. 6A is a front cross-sectional view illustrating the information acquisition device. FIG. 6B is a side cross-sectional view illustrating a lower portion of the information acquisition device.

DETAILED DESCRIPTION OF THE EXAMPLE EMBODIMENTS

Figure 1:
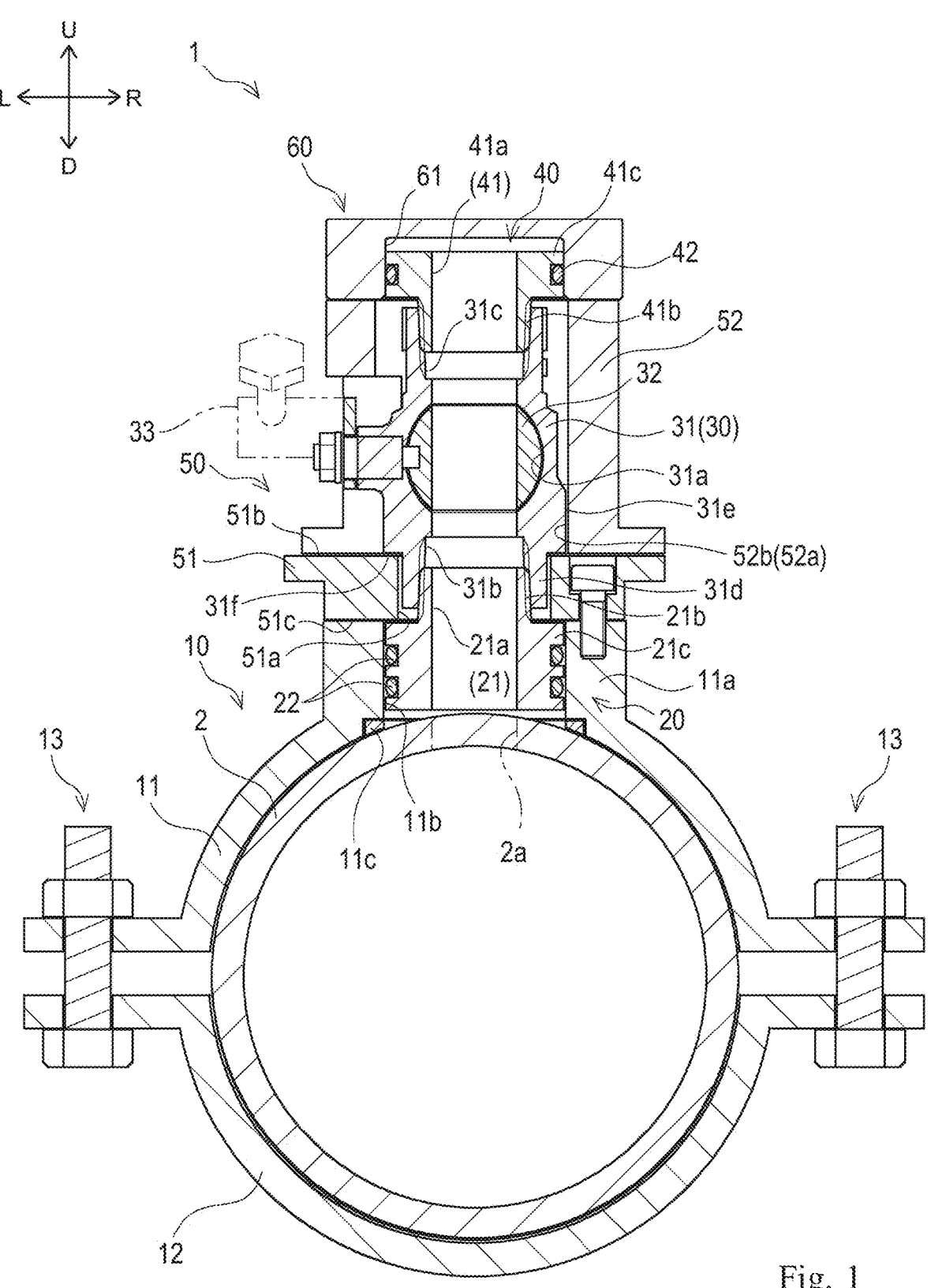
FIG. 1 is a front cross-sectional view illustrating an attachment device and a water pipe according to a first example embodiment of the present disclosure.

In the following description, directions indicated by arrows U, D, F, B, L, and R in the drawings are defined as an upward direction, a downward direction, a forward direction, a backward direction, a left direction, and a right direction, respectively. Note that the drawings referred to in the following description are schematic diagrams, and the specific shapes and dimensions of each component are not limited to those illustrated in the drawings.

An attachment device 1 according to a first example embodiment will be described below with reference to FIGS. 1 to 8.

The attachment device 1 is for attaching an information acquisition device 80 that acquires information regarding a water pipe 2. Hereinafter, first, the water pipe 2 will be described with reference to FIG. 1.

The water pipe 2 illustrated in FIG. 1 is an existing pipe buried in the ground. The water pipe 2 extends in a front-back direction. The water pipe 2 is formed of, for example, metal. Tap water (fluid) flows through the water pipe 2.

In the present example embodiment, a through hole 2a is formed in an upper surface of an arbitrary portion of the water pipe 2 by performing a through hole formation step described later (see FIG. 5). By opening the through hole 2a, it is possible to form a flow path branching through the through hole 2a. Note that, in the state illustrated in FIG. 1, a through hole 2a to attach the information acquisition device 80 is not formed in the water pipe 2.

Next, a configuration of the attachment device 1 will be described with reference to FIGS. 1 and 2. The attachment device 1 is installed in an arbitrary portion of the water pipe 2. A drilling machine 70 and the information acquisition device 80 described later are attached to the attachment device 1 installed in the water pipe 2. The attachment device 1 includes a pipe attachment portion 10, a lower valve connection portion 20, a valve portion 30, an upper valve connection portion 40, an attachment portion 50, and a cover portion 60.

The pipe attachment portion 10 illustrated in FIG. 1 is attached to the water pipe 2. The pipe attachment portion 10 preferably has a substantially cylindrical shape that is externally mounted on an outer peripheral surface of an arbitrary portion of the water pipe 2. The pipe attachment portion 10 is vertically dividable. The pipe attachment portion 10 includes an upper portion 11, a lower portion 12, and a coupling portion 13.

The upper portion 11 defines an upper portion of the pipe attachment portion 10. The upper portion 11 preferably has a substantially half cylindrical shape. A substantially cylindrical branch portion 11a is provided at a center of the upper portion 11 in a left-right direction so as to protrude upward. An opening 11b that opens vertically is provided in the branch portion 11a. The opening 11b communicates with an inner surface of the upper portion 11. An upper end surface of the branch portion 11a is orthogonal to a central axis (axis oriented in a vertical direction) of the opening 11b. Furthermore, a gasket 11c capable of stopping water between an inner surface of the pipe attachment portion 10 and the outer peripheral surface of the water pipe 2 is provided at an edge portion of the opening 11b on the inner surface of the upper portion 11.

The lower portion 12 defines a lower portion of the pipe attachment portion 10. The lower portion 12 preferably has a substantially half cylindrical shape.

The coupling portion 13 couples the upper portion 11 and the lower portion 12. The coupling portion 13 according to the present example embodiment includes a bolt inserted through the upper portion 11 and the lower portion 12, and a nut fitted to the bolt. A pair of the coupling portions 13 is provided on the left and right.

As illustrated in FIG. 1, the upper portion 11 and the lower portion 12 are attached so as to sandwich the water pipe 2 vertically, and the upper portion 11 and the lower portion 12 are fixed to each other using the pair of coupling portions 13, such that the pipe attachment portion 10 can be attached to the water pipe 2.

The lower valve connection portion 20 is disposed in the opening 11b of the pipe attachment portion 10 and is connected to a lower portion of the valve portion 30 described later. The lower valve connection portion 20 includes a main body 21 and an O-ring 22.

The main body 21 is a main structural body of the lower valve connection portion 20. The main body 21 preferably has a substantially cylindrical shape with an axial direction oriented in the vertical direction. As illustrated in FIG. 2, the main body 21 preferably has a structure in which a lower portion is enlarged in diameter with respect to an upper portion. The main body 21 includes a through hole 21a, a male screw portion 21b, and an enlarged diameter portion 21c.

The through hole 21a is a portion vertically penetrating the lower valve connection portion 20.

The male screw portion 21b defines an upper portion of the lower valve connection portion 20. An outer peripheral surface of the male screw portion 21b is subjected to screw processing. The male screw portion 21b preferably has a tapered shape (diameter gradually decreases upward).

The enlarged diameter portion 21c defines a lower portion of the lower valve connection portion 20. An outer diameter of the enlarged diameter portion 21c is slightly smaller than an inner diameter of the opening 11b of the pipe attachment portion 10. On an outer peripheral surface of the enlarged diameter portion 21c, a pair of grooves extending in a circumferential direction are located at intervals in the vertical direction.

The O-ring 22 is a ring-shaped structure that seals (fills) a gap between the outer peripheral surface of the enlarged diameter portion 21c and the inner peripheral surface of the opening 11b of the pipe attachment portion 10. The O-ring 22 is preferably made of a flexible material such as rubber. The O-ring 22 is provided in each of the pair of grooves in the enlarged diameter portion 21c.

The valve portion 30 can switch between stopping water in a flow path branched from the water pipe 2 (a flow path branched through the through hole 2a) and releasing the stopping water. A lower portion of the valve portion 30 is connected to the lower valve connection portion 20. In the present example embodiment, a ball valve is adopted as the valve portion 30. Note that the valve portion 30 is not limited to the ball valve, and various valves such as a butterfly valve can be adopted. The valve portion 30 includes a main body 31, a valve body 32, and an operator 33.

The main body 31 is a main structural body of the valve portion 30. The main body 31 preferably has a substantially cylindrical shape with an axial direction oriented in the vertical direction. The main body 31 includes a through hole 31a penetrating the main body 31 in the vertical direction.

A first female screw portion 31b to be fitted with the male screw portion 21b of the lower valve connection portion 20 is provided on a lower end side of the through hole 31a. An inner peripheral surface of the first female screw portion 31b is subjected to screw processing. The first female screw portion 31b preferably has a tapered shape whose diameter gradually increases toward the lower side.

A second female screw portion 31c to be fitted with a male screw portion 41b of the upper valve connection portion 40 described later is provided on an upper end side of the through hole 31a. An inner peripheral surface of the second female screw portion 31c is subjected to screw processing. The second female screw portion 31c preferably has a tapered shape whose diameter gradually increases upward.

Figure 2:
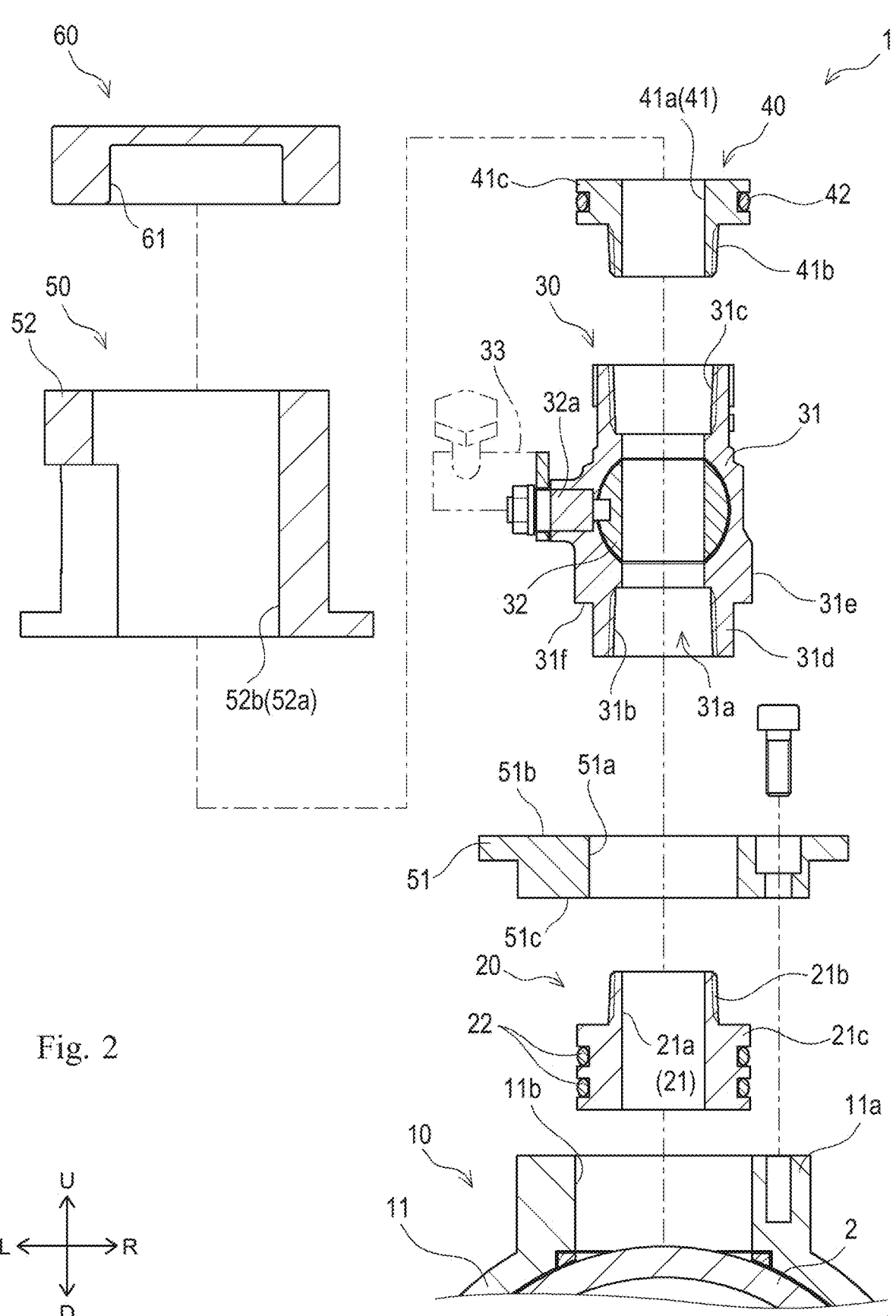
FIG. 2 is an exploded front cross-sectional view illustrating the attachment device and the water pipe.

As illustrated in FIG. 2, the main body 31 preferably has a structure in which a lower end portion 31d is reduced in diameter with respect to a portion (central portion 31e) above the lower end portion 31d. Furthermore, a step portion 31f that connects the lower end portion 31d and the central portion 31e is provided in the main body 31. The step portion 31f defines a surface facing downward.

The valve body 32 can stop water from the through hole 31a. The valve body 32 preferably has a substantially spherical shape in which a hole penetrating in one direction is provided. The valve body 32 is provided at a middle portion in the vertical direction of the through hole 31a. The valve body 32 is provided so as to be rotatable about a rotation shaft 32a whose axis is oriented in the left-right direction with respect to the main body 31.

The operator 33 is operable to rotate the valve body 32. The operator 33 is coupled to the main body 31 through the rotation shaft 32a of the main body 31.

By rotating the valve body 32 using the operator 33, it is possible to switch between a state in which the through hole 31a is closed by the valve body 32 (state in which water stop is performed) and a state in which the through hole 31a is opened through the hole of the valve body 32 (state in which water stop is released).

The upper valve connection portion 40 is connected to an upper portion of the valve portion 30. The upper valve connection portion 40 includes a main body 41 and an O-ring 42.

The main body 41 is a main structural body of the upper valve connection portion 40. The main body 41 preferably has a substantially cylindrical shape with an axial direction oriented in the vertical direction. As illustrated in FIG. 2, the main body 41 preferably has a shape in which an upper portion is enlarged in diameter with respect to a lower portion. The main body 41 includes a through hole 41a, a male screw portion 41b, and an enlarged diameter portion 41c.

The through hole 41a is a portion vertically penetrating the upper valve connection portion 40.

The male screw portion 41b defines a lower portion of the upper valve connection portion 40. An outer peripheral surface of the male screw portion 41b is subjected to screw processing. The male screw portion 41b preferably has a tapered shape (diameter gradually decreases toward the lower side). The male screw portion 41b is fitted with the second female screw portion 31c of the valve portion 30 (main body 31).

The enlarged diameter portion 41c defines an upper portion of the upper valve connection portion 40. A groove extending in the circumferential direction is provided on an outer peripheral surface of the enlarged diameter portion 41c. The cover portion 60 described later is attached to the enlarged diameter portion 41c.

The O-ring 42 is a ring-shaped structure provided in the groove in the enlarged diameter portion 41c. The O-ring 42 is preferably made of a flexible material such as rubber.

The attachment portion 50 can be attached with the drilling machine 70 or the information acquisition device 80. Specifically, the attachment portion 50 has a structure such that both the drilling machine 70 and the information acquisition device 80 are detachable, and an arbitrarily selected one of the drilling machine 70 and the information acquisition device 80 is attached thereto. The attachment portion 50 preferably has a substantially cylindrical shape with an axial direction oriented in the vertical direction. The attachment portion 50 is attached to the branch portion 11a of the pipe attachment portion 10. As illustrated in FIG. 1, the valve portion 30 is disposed inside the attachment portion 50. The attachment portion 50 is vertically dividable. The attachment portion 50 includes a first attachment portion 51 and a second attachment portion 52.

The first attachment portion 51 defines a lower portion (lower end portion) of the attachment portion 50. A through hole 51a penetrating the first attachment portion 51 in the vertical direction is provided in the first attachment portion 51. As illustrated in FIG. 1, a lower end portion 31d of the valve portion 30 (main body 31) is inserted into the through hole 51a. An inner diameter of the through hole 51a is slightly larger than an outer diameter of the lower end portion 31d. Furthermore, the inner diameter of the through hole 51$a$ is smaller than an outer diameter of the enlarged diameter portion 21$c$ of the lower valve connection portion 20.

Furthermore, as illustrated in FIG. 2, the first attachment portion 51 includes an upper surface 51$b$ that is a surface facing upward and a lower surface 51$c$ that is a surface facing downward. The upper surface 51$b$ and the lower surface 51$c$ are orthogonal to an axis oriented in the vertical direction (a central axis of the opening 11$b$). The first attachment portion 51 is fixed to an upper end portion of the branch portion 11$a$ of the pipe attachment portion 10 using a stopper such as a bolt. Furthermore, the first attachment portion 51 includes a flange with an enlarged diameter at an upper end portion.

The second attachment portion 52 defines an upper portion (portion excluding a lower end portion) of the attachment portion 50. A through hole 52$a$ vertically penetrating the second attachment portion 52 is provided in the second attachment portion 52. An inner diameter of the through hole 52$a$ is slightly larger than an outer diameter of the central portion 31$e$ of the main body 31 of the valve portion 30. Most of the valve portion 30 (a portion excluding the lower end portion 31$d$ of the main body 31 and the operator 33) is inserted into the through hole 52$a$. A lower left portion of the second attachment portion 52 is cut out so as to avoid interference with the operator 33 of the valve portion 30. Furthermore, an inner peripheral surface 52$b$ of the through hole 52$a$ abuts against or approaches the central portion 31$e$ of the main body 31.

The drilling machine 70, the information acquisition device 80, and the cover portion 60 described later are attached to an upper end portion of the second attachment portion 52. Furthermore, the second attachment portion 52 includes a flange having an enlarged diameter at a lower end portion. The second attachment portion 52 can be fixed to the first attachment portion 51 by fixing the flanges on the second attachment portion 52 and the first attachment portion 51 to each other using a stopper such as a bolt.

The cover portion 60 closes the through hole 41$a$ of the upper valve connection portion 40. The cover portion 60 preferably has a substantially cylindrical shape with an axial direction oriented in the vertical direction. The cover portion 60 is fixed to an upper end portion of the second attachment portion 52 using a stopper such as a bolt. The cover portion 60 includes a recess 61.

The recess 61 is a portion recessed upward on a lower surface of the cover portion 60. The recess 61 preferably has a substantially circular shape in a bottom view. The enlarged diameter portion 41$c$ of the upper valve connection portion 40 is inserted into the recess 61. An inner diameter of the recess 61 is slightly larger than an outer diameter of the enlarged diameter portion 41$c$ of the upper valve connection portion 40. A gap between an inner peripheral surface of the recess 61 and an outer peripheral surface of the enlarged diameter portion 41$c$ is sealed by the O-ring 42.

Next, a state in which the attachment device 1 as described above is installed in the water pipe 2 will be described.

First, a worker who installs the attachment device 1 disposes the upper portion 11 and the lower portion 12 of the pipe attachment portion 10 so as to sandwich an arbitrary portion of the water pipe 2, and fixes the upper portion 11 and the lower portion 12 to each other using a stopper. As a result, the pipe attachment portion 10 is attached to the water pipe 2 (see FIG. 1). Note that the pipe attachment portion 10 is attached such that the opening 11$b$ opens upward.

Next, the worker attaches a structure such as the valve portion 30 to the branch portion 11$a$ of the pipe attachment portion 10. At this time, for example, as illustrated in FIG. 3, the valve portion 30 in a state in which the lower valve connection portion 20, the upper valve connection portion 40, and the first attachment portion 51 are assembled can be attached to the branch portion 11$a$.

Figure 3:
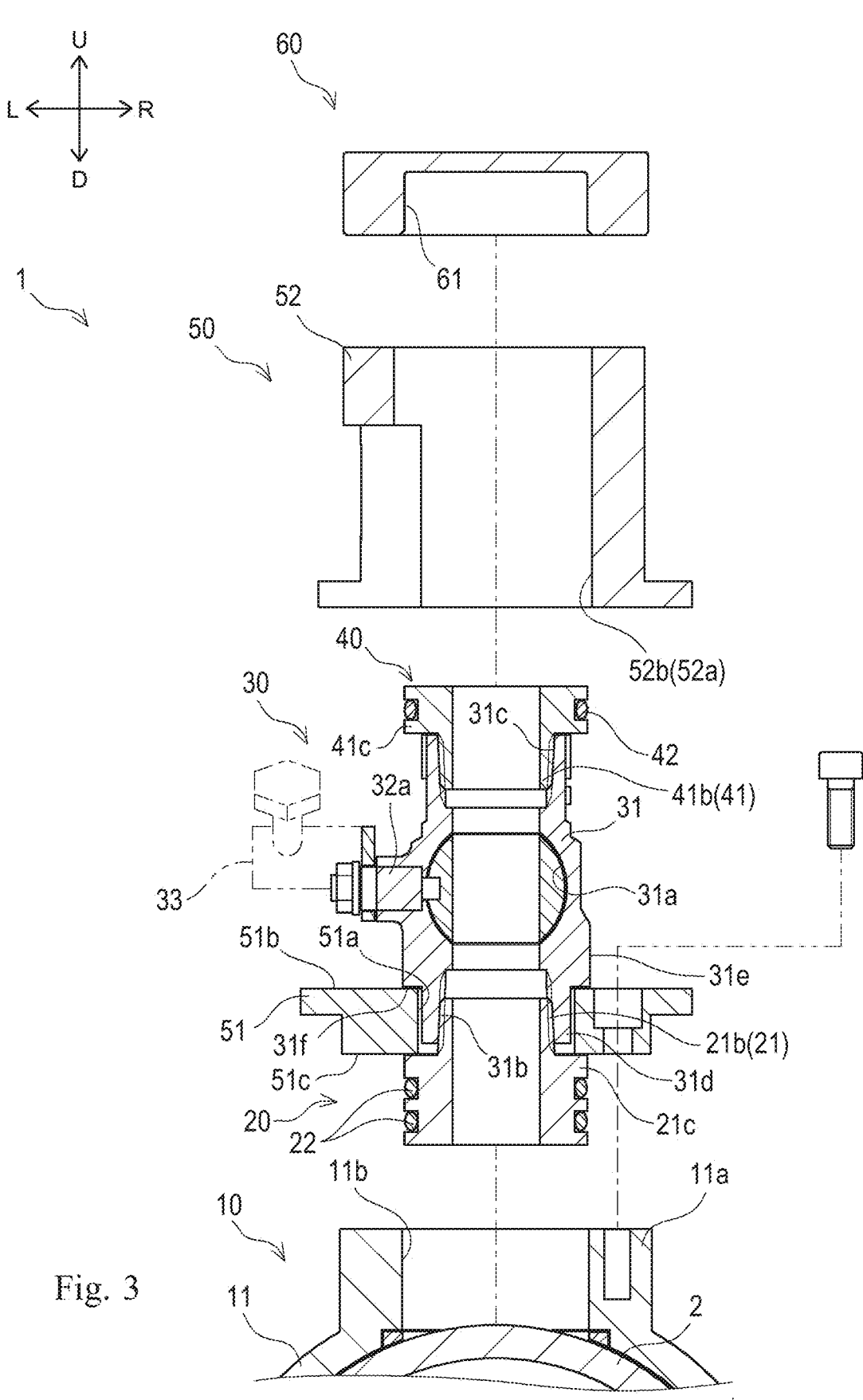
FIG. 3 is a front cross-sectional view illustrating a state in which the attachment device is installed with respect to the water pipe.
Figure 4:
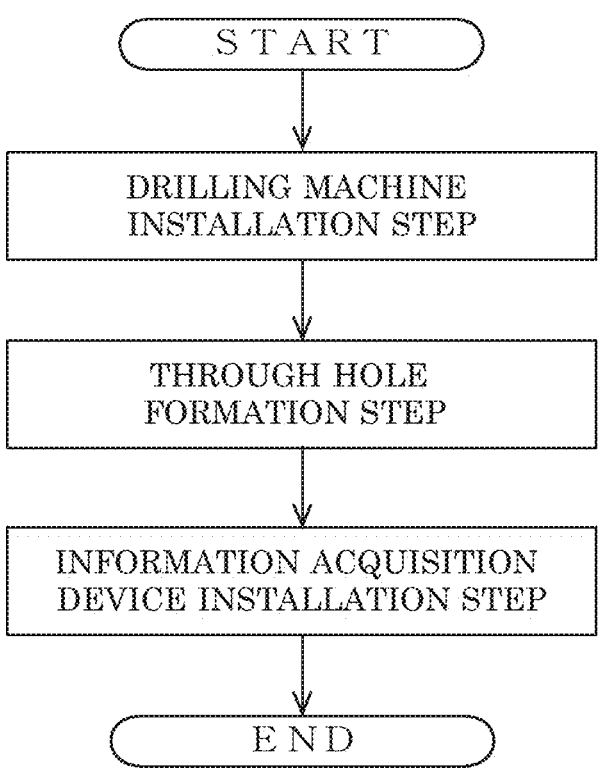
FIG. 4 is a flowchart illustrating an attachment method of an information acquisition device.

In the example illustrated in FIG. 3, in a state where the lower end portion 31$d$ of the valve portion 30 (main body 31) is inserted into the through hole 51$a$ of the first attachment portion 51, the male screw portion 21$b$ of the lower valve connection portion 20 is fitted to the first female screw portion 31$b$ of the main body 31. With such a configuration, the first attachment portion 51 is sandwiched between the valve portion 30 (main body 31) and the lower valve connection portion 20. More specifically, the first attachment portion 51 is sandwiched between the step portion 31$f$ of the main body 31 and the enlarged diameter portion 21$c$ of the lower valve connection portion 20.

By inserting the enlarged diameter portion 21$c$ (lower valve connection portion 20), which is the lower end portion of each structural element (lower valve connection portion 20, valve portion 30, upper valve connection portion 40, and first attachment portion 51) assembled as described above, into the opening 11$b$ of the pipe attachment portion 10, each structural element described above can be attached to the branch portion 11$a$. At this time, the worker inserts the enlarged diameter portion 21$c$ into the opening 11$b$ by pushing the enlarged diameter portion 21$c$ against the frictional force of the O-ring 22. In this state, by fixing the first attachment portion 51 to the branch portion 11$a$ using a stopper such as a bolt, each structural element described above is fixed to the branch portion 11$a$ (see FIG. 1).

In this state, the upper end surface of the branch portion 11$a$ and the lower surface 51$c$ of the first attachment portion 51 abut against each other. Furthermore, the upper surface 51$b$ of the first attachment portion 51 and the step portion 31$f$ of the main body 31 of the valve portion 30 abut against each other. With such a configuration, the step portion 31$f$ of the valve portion 30 is disposed parallel to a surface (the upper surface 51$b$ or the upper end surface of the branch portion 11$a$) orthogonal to the central axis of the opening 11$b$. As described above, by using the first attachment portion 51, it is possible to reduce or prevent the positional deviation of the valve portion 30 with respect to the opening 11$b$, and to easily center the valve portion 30 with respect to the opening 11$b$.

Furthermore, as described above, the gap between the inner peripheral surface of the opening 11$b$ of the pipe attachment portion 10 and the outer peripheral surface of the enlarged diameter portion 21$c$ is sealed by the O-ring 22. The gap is waterproofed by the O-ring 22. As described above, in the present example embodiment, the male screw and the female screw are provided on the inner peripheral surface of the opening 11$b$ and the outer peripheral surface of the enlarged diameter portion 21$c$, and water stop is performed by the O-ring 22 instead of performing water stop by fitting them. This makes it possible to reduce the size of each structural element (the pipe attachment portion 10 and the lower valve connection portion 20). That is, in a case where water stoppage is performed by fitting portions where a male screw and a female screw are mated to each other, a processing margin for performing screw processing is required, and thus it is difficult to reduce the size of the structure. On the other hand, when the O-ring 22 is used, screw processing is unnecessary, and the structure can be downsized, so that space saving can be achieved.

Specifically, the attachment device 1 according to the present example embodiment needs to be installed so as not to be directly buried in the ground in order to perform maintenance such as replacement of an information acquirer 84 to be described later, unlike, for example, a conventional faucet that is buried back in the ground. Therefore, the attachment device 1 is installed so that the periphery is covered with an appropriate box or the like (not illustrated). According to the present example embodiment, by adopting the structure using the O-ring 22 as described above, it is possible to reduce the size of the attachment device 1, and eventually it is possible to reduce the installation space of the box covering the attachment device 1. As a result, it is possible to reduce the cost of excavation and the like for installing the box and shorten the process.

Next, the worker provides the second attachment portion 52 so as to insert the valve portion 30 (body portion 31) therethrough, and fixes the second attachment portion 52 to the first attachment portion 51 using a stopper such as a bolt.

Next, the worker disposes the cover portion 60 on the upper end portion of the second attachment portion 52 and fixes the cover portion to the second attachment portion 52 using a stopper such as a bolt. In this way, installation of the attachment device 1 with respect to the water pipe 2 is completed.

FIG. 1 illustrates the attachment device 1 that is completely installed in the water pipe 2. In this state, the holes (opening 11b, through hole 21a, through hole 31a, and through hole 41a) vertically penetrating the structural elements of the attachment device 1 communicate with each other.

By using the attachment device 1 as described above, the through hole 2a can be formed in the outer peripheral surface of the water pipe 2 by the drilling machine 70, and the information acquisition device 80 can be attached through the through hole 2a.

An attachment method of the information acquisition device 80 will be described below with reference to FIGS. 4 to 8. As illustrated in a flowchart of FIG. 4, the attachment method of the information acquisition device 80 includes a "drilling machine installation step", a "through hole formation step", and an "information acquisition device installation step". Hereinafter, each step will be described in order.

First, the "drilling machine installation step" will be described. The drilling machine installation step is a step of attaching the drilling machine 70 to the attachment device 1 installed in the water pipe 2. Hereinafter, first, the configuration of the drilling machine 70 will be described.

Figure 5:
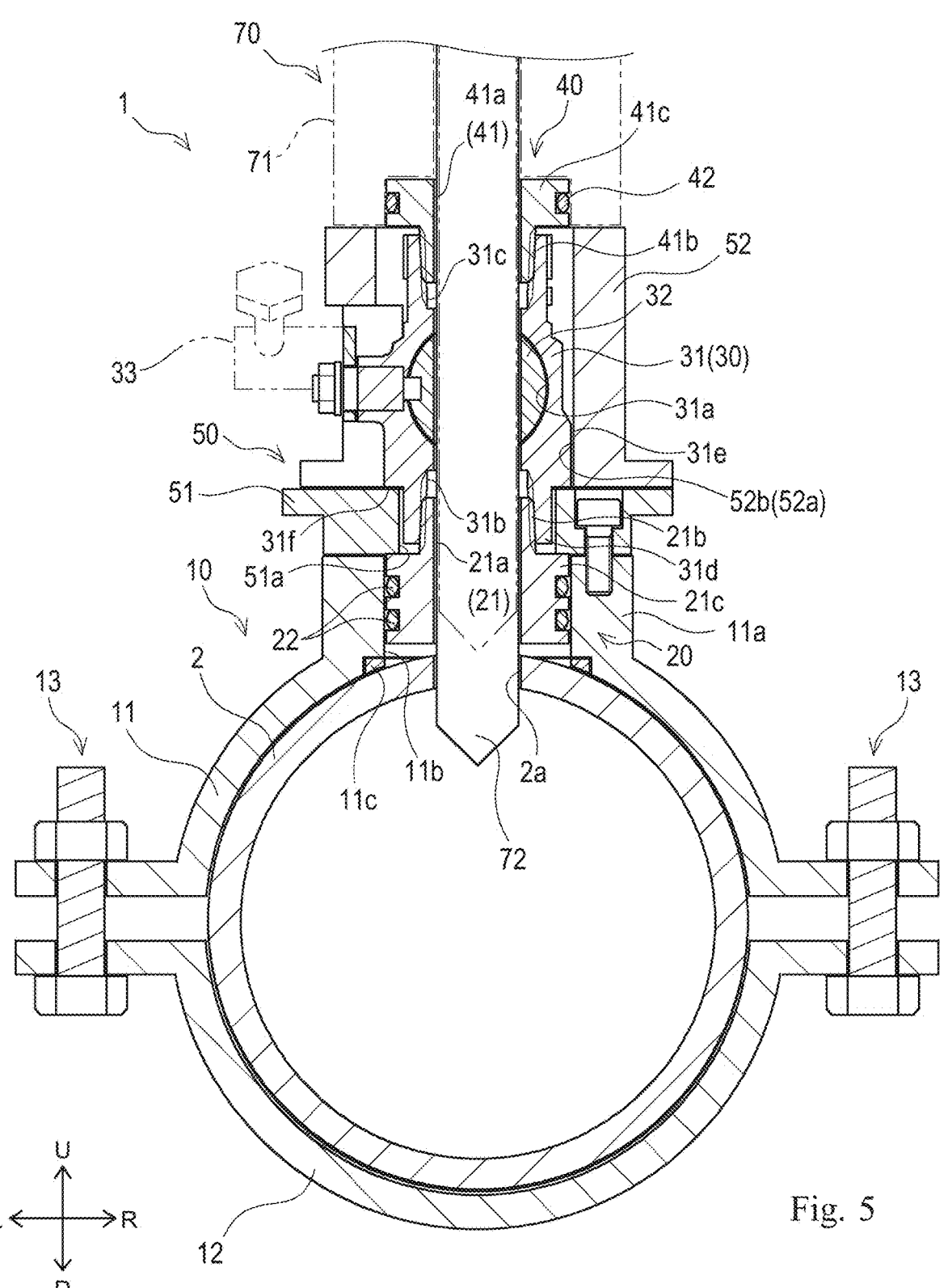
FIG. 5 is a front cross-sectional view illustrating the attachment device and the water pipe in a through hole formation step.

The drilling machine 70 illustrated in FIG. 5 is a device that forms the through hole 2a in the water pipe 2. As the drilling machine 70, various devices capable of forming a hole in the water pipe 2 can be adopted. The drilling machine 70 includes a support portion 71 and a drill 72.

The support portion 71 is a portion attached to the second attachment portion 52 of the attachment device 1.

The drill 72 is a portion that forms the through hole 2a in the water pipe 2. The drill 72 preferably has an elongated shape in the vertical direction. The drill 72 is supported by the support portion 71 so as to be rotatable about a rotation axis whose axis is directed in the vertical direction and movable in the vertical direction.

In the drilling machine installation step, the worker first removes the cover portion 60 from the attachment device 1. Next, the worker disposes the drilling machine 70 such that the drill 72 is inserted into each through hole (opening 11b, through hole 21a, through hole 31a, and through hole 41a) of the attachment device 1. Next, the worker fixes the support portion 71 to the upper end portion of the second attachment portion 52 using a stopper such as a bolt. In this way, the drilling machine installation step is completed.

Next, the "through hole formation step" will be described. The through hole formation step is a step of forming the through hole 2a in the water pipe 2. In the through hole formation step, as illustrated in FIG. 5, the worker feeds the drill 72 along each through hole (opening 11b, through hole 21a, through hole 31a, and through hole 41a) of the attachment device 1 to perform drilling on the water pipe 2, thus forming the through hole 2a. In this way, the through hole formation step is completed.

In a state where the through hole 2a is formed in the water pipe 2, the through hole 2a communicates with each through hole (opening 11b, through hole 21a, through hole 31a, and through hole 41a) of the attachment device 1. As a result, a flow path branching upward through the through hole 2a is formed in the water pipe 2. Note that, at this time, the valve portion 30 is operated to close the through hole 31a by the valve body 32, so that it is possible to stop water in the branched flow path.

Figure 7:
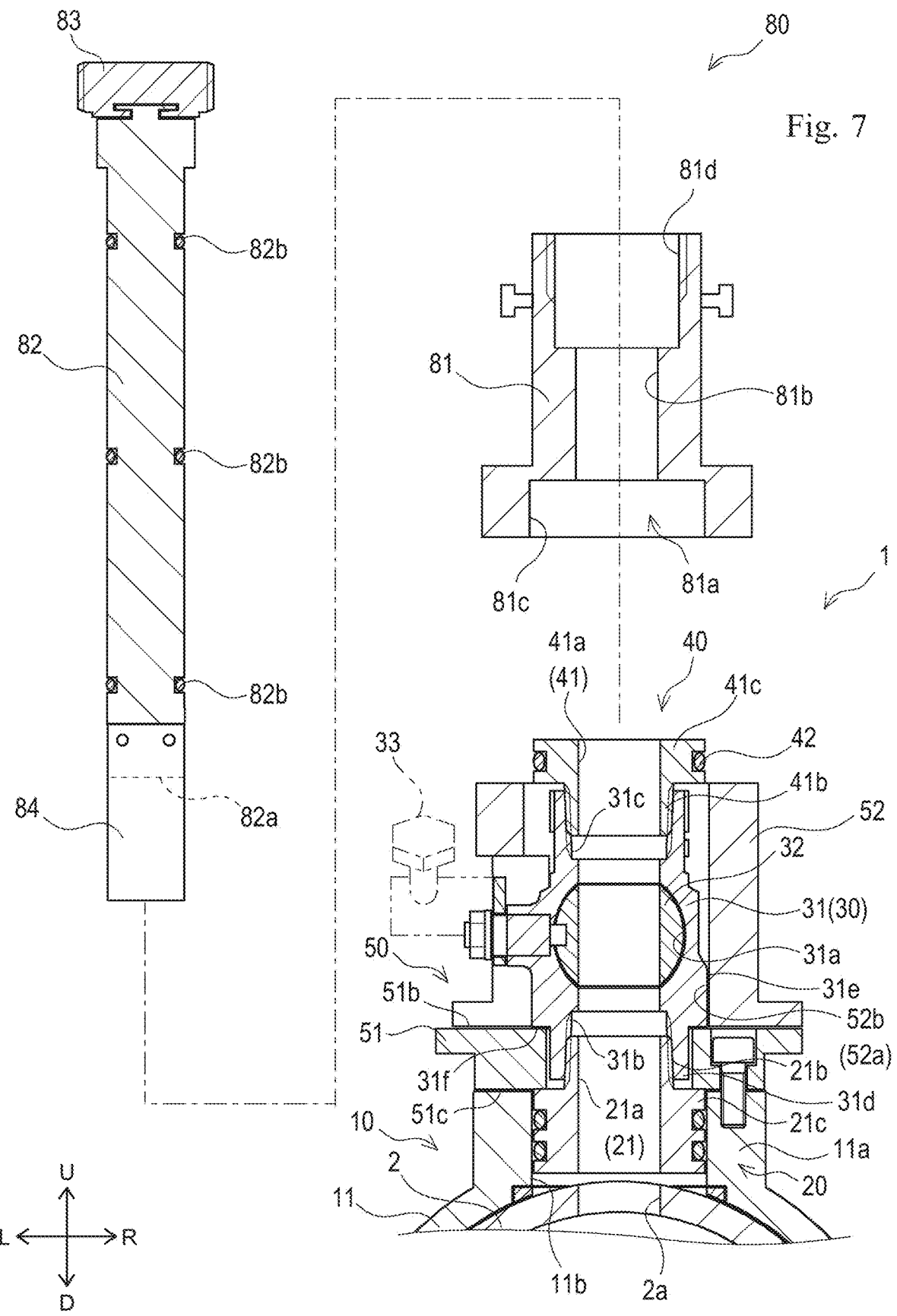
FIG. 7 is a front cross-sectional view illustrating the attachment device and the water pipe in an information acquisition device installation step.
Figure 8:
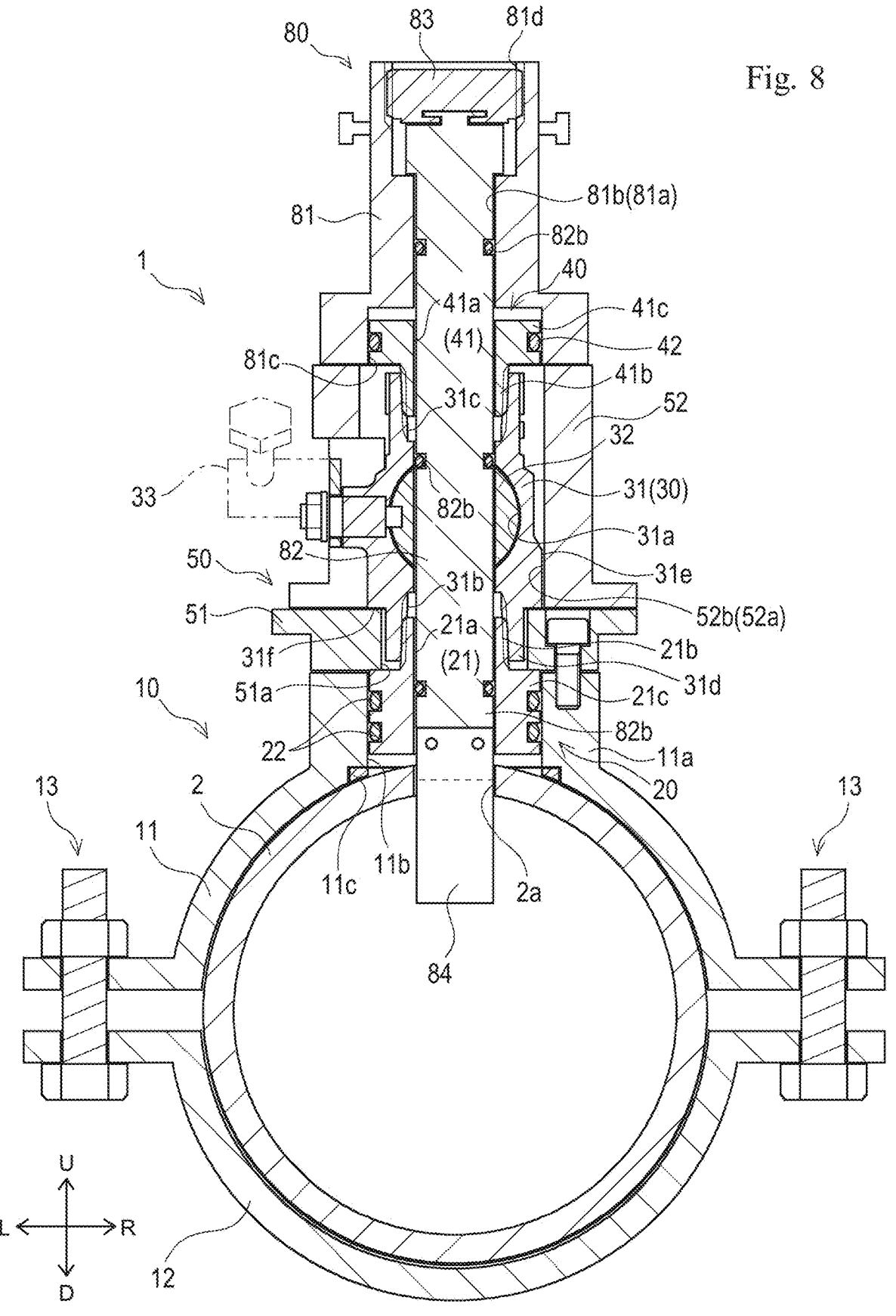
FIG. 8 is a front cross-sectional view illustrating the attachment device and the water pipe in a state where the information acquisition device is installed.

Next, the "information acquisition device installation step" will be described. The information acquisition device installation step illustrated in FIGS. 7 and 8 is a step of attaching the information acquisition device 80 to the attachment device 1. In the information acquisition device installation step, the worker first removes the drilling machine 70 from the attachment device 1.

Next, the worker installs the information acquisition device 80 in the attachment device 1. In the present example embodiment, an example in which the information acquisition device 80 is installed without interruption of water supply will be described. Hereinafter, first, a configuration of the information acquisition device 80 will be described.

The information acquisition device 80 illustrated in FIGS. 6A and 6B acquires information regarding the water pipe 2 through the through hole 2a. The information acquisition device 80 is attached to the attachment device 1. The information acquisition device 80 includes a support portion 81, a shaft portion 82, an operator 83, and an information acquirer 84.

The support portion 81 illustrated in FIG. 6A is a portion attached to the second attachment portion 52 of the attachment device 1. The support portion 81 preferably has a substantially cylindrical shape (a cylindrical shape in which a lower end portion is enlarged in diameter) with an axial direction oriented in the vertical direction. A through hole 81a vertically penetrating the support portion 81 is provided in the support portion 81.

On a lower end side of the through hole 81a, a first enlarged diameter portion 81c with an enlarged diameter with respect to a central portion (central portion 81b) in the vertical direction of the through hole 81a is formed. As illustrated in FIG. 8, in a state where the information acquisition device 80 is installed in the attachment device 1, the enlarged diameter portion 41c of the upper valve connection portion 40 is inserted into the first enlarged diameter portion 81c. An inner diameter of the first enlarged diameter portion 81c is slightly larger than an outer diameter of the enlarged diameter portion 41c of the upper valve connection portion 40. A gap between an inner peripheral surface of the first enlarged diameter portion 81c and an outer peripheral surface of the enlarged diameter portion 41c is sealed by the O-ring 42.

A second enlarged diameter portion 81d enlarged in diameter with respect to the central portion 81b is provided on an upper end side of the through hole 81a. An inner peripheral surface of the second enlarged diameter portion 81d is subjected to screw processing.

The shaft portion 82 illustrated in FIGS. 6A and 6B are portions to which an information acquirer 84 described later can be attached. The shaft portion 82 preferably has a substantially cylindrical shape elongated in the vertical direction. The shaft portion 82 is inserted into the through hole 81a of the support portion 81. As illustrated in FIG. 6A, an outer diameter of a portion excluding the upper end portion of the shaft portion 82 is slightly smaller than an inner diameter of the central portion 81b of the through hole 81a. Furthermore, an outer diameter of the upper end portion of the shaft portion 82 is larger than the inner diameter of the central portion 81b of the through hole 81a.

Furthermore, as illustrated in FIG. 6B, an attachment portion 82a to which the information acquirer 84 is attached is provided at a lower end portion of the shaft portion 82. The attachment portion 82a includes a front side surface that is a flat surface to which the information acquirer 84 can be attached.

Furthermore, a groove extending in the circumferential direction on an outer peripheral surface is provided in the shaft portion 82. A plurality of (three in the illustrated example) grooves is provided at intervals in the vertical direction. Each of the grooves is provided with an O-ring 82b that seals (fills) a gap between the outer peripheral surface of the shaft portion 82 and the inner peripheral surface such as the central portion 81b of the through hole 81a. The O-ring 82b is preferably made of a flexible material such as rubber.

The operator 83 is provided to attach the shaft portion 82 to the support portion 81. The operator 83 preferably has a substantially cylindrical shape with an axial direction oriented in the vertical direction. The operator 83 is attached to an upper end portion of the shaft portion 82. An outer peripheral surface of the operator 83 is subjected to screw processing. The shaft portion 82 can be attached to the support portion 81 by screwing the operator 83 into the second enlarged diameter portion 81d of the support portion 81.

The information acquirer 84 illustrated in FIGS. 6A and 6B acquires information regarding the water pipe 2. The information acquirer 84 is preferably made of an elastically deformable plate-shaped body and a strain gauge (not illustrated) provided on surfaces (front surface and rear surface) of the plate-shaped body. The information acquirer 84 is fixed to the front surface of the attachment portion 82a using an appropriate stopper.

The information acquirer 84 detects deformation of the plate-shaped body due to receiving the pressure of water with the strain gauge to acquire the flow velocity and the flowing direction of water flowing through the water pipe 2 (see FIG. 6B). An appropriate lead wire (not illustrated) is connected to the strain gauge. An acquisition result by the information acquirer 84 can be transmitted to an external device (for example, an external server or the like) by an appropriate communication device connected to the lead wire. Note that, although not illustrated in FIGS. 6A and 6B and the like, an insertion hole for drawing out the lead wire to the outside of the information acquisition device 80 may be provided in an appropriate location (for example, the shaft portion 82) of the information acquisition device 80.

Hereinafter, details of a method for installing the above-described information acquisition device 80 in the attachment device 1 will be described.

First, the worker attaches the support portion 81 to the second attachment portion 52 of the attachment device 1.

The attachment is performed by fixing the support portion 81 to the upper end portion of the second attachment portion 52 of the attachment device 1 using a stopper such as a bolt. In this state, the through hole 81a of the support portion 81 communicates with a flow path (opening 11b, through hole 21a, through hole 31a, and through hole 41a) of the attachment device 1. Note that, at this time point, it is assumed that the flow path (through hole 31a) of the attachment device 1 is closed by the valve body 32 of the valve portion 30.

Next, the worker inserts the shaft portion 82 provided with the operator 83 and the information acquirer 84 into the support portion 81 with respect to the through hole 81a. At this time point, the lower end portion of the information acquirer 84 is located above the valve body 32 of the valve portion 30.

Next, the worker operates the valve portion 30 to open the flow path (through hole 31a) of the attachment device 1. In this state, water is stopped between the shaft portion 82 and the through hole 81a (central portion 81b) by the O-ring 82b (lowermost O-ring 82b) provided in the shaft portion 82. Next, the worker pushes down the shaft portion 82 and inserts the shaft portion into the flow path of the attachment device 1. Furthermore, the worker performs an operation of screwing the operator 83 into the second enlarged diameter portion 81d of the support portion 81 to attach the shaft portion 82 to the support portion 81. In this way, the information acquisition device installation step is completed.

FIG. 8 illustrates a state in which the installation of the information acquisition device 80 is completed. In this state, a lower portion of the information acquirer 84 is located inside the water pipe 2 through the through hole 2a. As a result, the information acquirer 84 can acquire the flow velocity and the flowing direction of the water in the water pipe 2.

Furthermore, when replacement, maintenance, or the like of the information acquirer 84 is performed, the shaft portion 82 provided with the operator 83 and the information acquirer 84 can be removed from the support portion 81. In this case, the worker performs the removal work of the shaft portion 82 and the like in a reverse procedure to the attachment work described above.

In the present example embodiment, the plurality of O-rings 82b provided on the shaft portion 82 is provided so as to constantly stop water in the flow path of the attachment device 1 and the through hole 81a (central portion 81b) of the support portion 81 when the shaft portion 82 and the like are attached to and detached from the support portion 81. That is, in the present example embodiment, in each stage (for example, before and after the shaft portion 82 or the like passes through the valve body 32, or the like) when the shaft portion 82 or the like is attached or detached, the flow path of the attachment device 1 and the through hole 81a are waterproofed by any of the plurality of O-rings 82b. As described above, in the present example embodiment, the information acquisition device 80 can be installed without interruption of water supply.

The attachment method of the information acquisition device 80 has been described above. Note that the attachment method of the information acquisition device 80 described above is an example, and the work of the attachment method is not limited to the example described above and can be appropriately changed.

For example, in the information acquisition device installation step, a step of attaching a bush (anticorrosion core) to protect the inner peripheral surface of the through hole 2a may be executed after the drilling machine 70 is removed from the attachment device 1. In this case, work of deforming (enlarging a diameter of) the bush made of a substantially tubular metal is executed in a state where the bush is inserted into the through hole 2a using an appropriate bush mounting device. Thus, the bush can be mounted in the through hole 2a to protect the inner peripheral surface of the through hole 2a.

In this case, the bush mounting device can be installed in the attachment device 1. Specifically, the bush mounting device can be fixed to the upper end portion of the second attachment portion 52 using a stopper such as a bolt.

According to the attachment method of the information acquisition device 80 as described above, it is possible to install a plurality of types of devices such as the drilling machine 70 and the information acquisition device 80 (and further, the bush mounting device) using the attachment device 1 that is the same device. As a result, it becomes unnecessary to replace a device (jig) for attachment for each work, and the information acquisition device 80 can be easily installed at an arbitrary location of the water pipe 2.

As described above, the attachment device 1 according to the present example embodiment is an attachment device capable of forming the through hole 2a in the outer peripheral surface of the pipe (water pipe 2) using the drilling machine 70 and attaches the information acquisition device 80 that acquires information regarding the pipe (water pipe 2) through the through hole 2a, the attachment device including the pipe attachment portion 10 attached to the pipe (water pipe 2) and including the opening 11b communicating with the through hole 2a, the valve portion 30 attached so as to communicate with the opening 11b, the valve connection portion (lower valve connection portion 20) connecting the opening 11b and the valve portion 30, and the attachment portion 50 to which the drilling machine 70 or the information acquisition device 80 can be attached.

With such a configuration, the information acquisition device 80 can be easily installed at an arbitrary location of the pipe (water pipe 2). That is, the same attachment device 1 can be used to attach the drilling machine 70 to form the through hole 2a in the pipe (water pipe 2) and attach the information acquisition device 80. As a result, it is not necessary to replace the jig for each work, and the information acquisition device 80 can be easily installed at an arbitrary location of the pipe (water pipe 2).

Furthermore, the valve connection portion (lower valve connection portion 20) includes a main body 21 that is tubular, and an elastic structure (O-ring 22) provided on an outer peripheral surface of the main body 21 to seal between the outer peripheral surface of the main body 21 and an inner peripheral surface of the opening 11b.

With such a configuration, water of the pipe (water pipe 2) can be stopped in a relatively space-saving manner. For example, in a case where water stop is performed by forming and fitting male threads/female threads, a processing margin for performing screw processing is required, and thus it is difficult to reduce a size of the structure. On the other hand, when the elastic structure (O-ring 22) is used, screw processing is unnecessary, and the structure can be downsized, so that space saving can be achieved.

The attachment device 1 according to the present example embodiment needs to be installed so as not to be directly buried in the ground in order to perform maintenance such as replacement of the information acquirer 84, unlike, for example, a conventional water faucet that is buried back in the ground. Therefore, the attachment device 1 is installed so that the periphery is covered with an appropriate box or the like. According to the present example embodiment, by adopting the elastic structure (O-ring 22) as described above, it is possible to reduce a size of the attachment device 1, and it is possible to reduce an installation space of the box covering the attachment device 1. As a result, it is possible to reduce the cost of excavation and the like for installing the box and shorten the process.

Furthermore, the attachment portion 50 includes an abutment portion (upper surface 51b) that abuts against the valve portion 30 (step portion 31f) on a plane orthogonal to a central axis of the opening 11b.

With such a configuration, centering of the valve portion 30 with respect to the opening 11b of the pipe attachment portion 10 can be easily performed.

Furthermore, the information acquisition device 80 includes an information acquirer 84 to acquire information regarding the pipe (water pipe 2), a shaft portion 82 to which the information acquirer 84 is attachable, and an operator 83 to insert the shaft portion 82 into the through hole 2a.

With this configuration, since the information acquirer 84 can be installed inside the pipe (water pipe 2) via the through hole 2a, information regarding the pipe (water pipe 2) can be directly acquired.

Furthermore, an attachment method of the information acquisition device 80 according to an example embodiment of the present disclosure is an attachment method of the information acquisition device 80 using the attachment device 1 according to one of the above-described example embodiments, the attachment method including attaching the drilling machine 70 to the attachment device 1 attached to the pipe (water pipe 2), forming the through hole 2a in the pipe (water pipe 2) using the drilling machine 70 after the attaching the drilling machine, and detaching the drilling machine 70 from the attachment device 1 and attaching the information acquisition device 80 to the attachment device 1 after the forming the through hole.

With such a configuration, it is possible to attach the drilling machine 70 for forming the through hole 2a in the pipe (water pipe 2) and attach the information acquisition device 80 using the same attachment device 1. As a result, it is not necessary to replace the jig for each work, and the information acquisition device 80 can be easily installed at an arbitrary location of the pipe (water pipe 2).

Note that the water pipe 2 according to the present example embodiment is an example embodiment of the pipe according to the present invention.

Furthermore, the lower valve connection portion 20 according to the present example embodiment is an example embodiment of a valve connection portion according to the present invention.

Furthermore, the O-ring 22 according to the present example embodiment is an example embodiment of the elastic structure according to the present invention.

Furthermore, the upper surface 51b according to the present example embodiment is an example embodiment of the abutment portion according to the present invention.

Although the example embodiments of the present invention has been described above, the present invention is not limited to the above configuration, and various modifications can be made within the scope of the invention described in the claims.

For example, in the present example embodiment, an example in which substantially the entire surfaces of an abutment portion (upper surface 51b) of the attachment portion 50 and the step portion 31f of the valve portion 30 abut against each other has been described, but the present invention is not limited to such an example embodiment. For example, the abutment portion (upper surface 51b) of the attachment portion 50 and the step portion 31f of the valve portion 30 may abut against each other at least at a portion in a plane orthogonal to an axis oriented in the vertical direction (central axis of the opening 11b). In this case, for example, the attachment portion 50 and the valve portion 30 may abut against each other at a plurality of points (for example, three points) or lines in a virtual plane orthogonal to the central axis of the opening 11b.

Furthermore, in the present example embodiment, the configuration in which the valve portion 30 is centered with respect to the opening 11b of the pipe attachment portion 10 by making the upper surface 51b of the first attachment portion 51 and the step portion 31f of the valve portion 30 abut against each other has been described, but the present invention is not limited to such an example embodiment. For example, instead of or in addition to the above configuration, the centering of the valve portion 30 may be performed by making the central portion 31e of the valve portion 30 and the inner peripheral surface 52b of the through hole 52a of the second attachment portion 52 abut against each other. In this case, the inner diameter of the through hole 52a may be substantially equal to the outer diameter of the central portion 31e of the valve portion 30.

Furthermore, second to fourth example embodiments of the present invention will be described below with reference to FIGS. 9 to 11. Note that, in the following description of other example embodiments, differences from the first example embodiment will be mainly described, and configurations substantially similar to those of the first example embodiment will be denoted by the same reference signs, and description thereof will be omitted.

Figure 9:
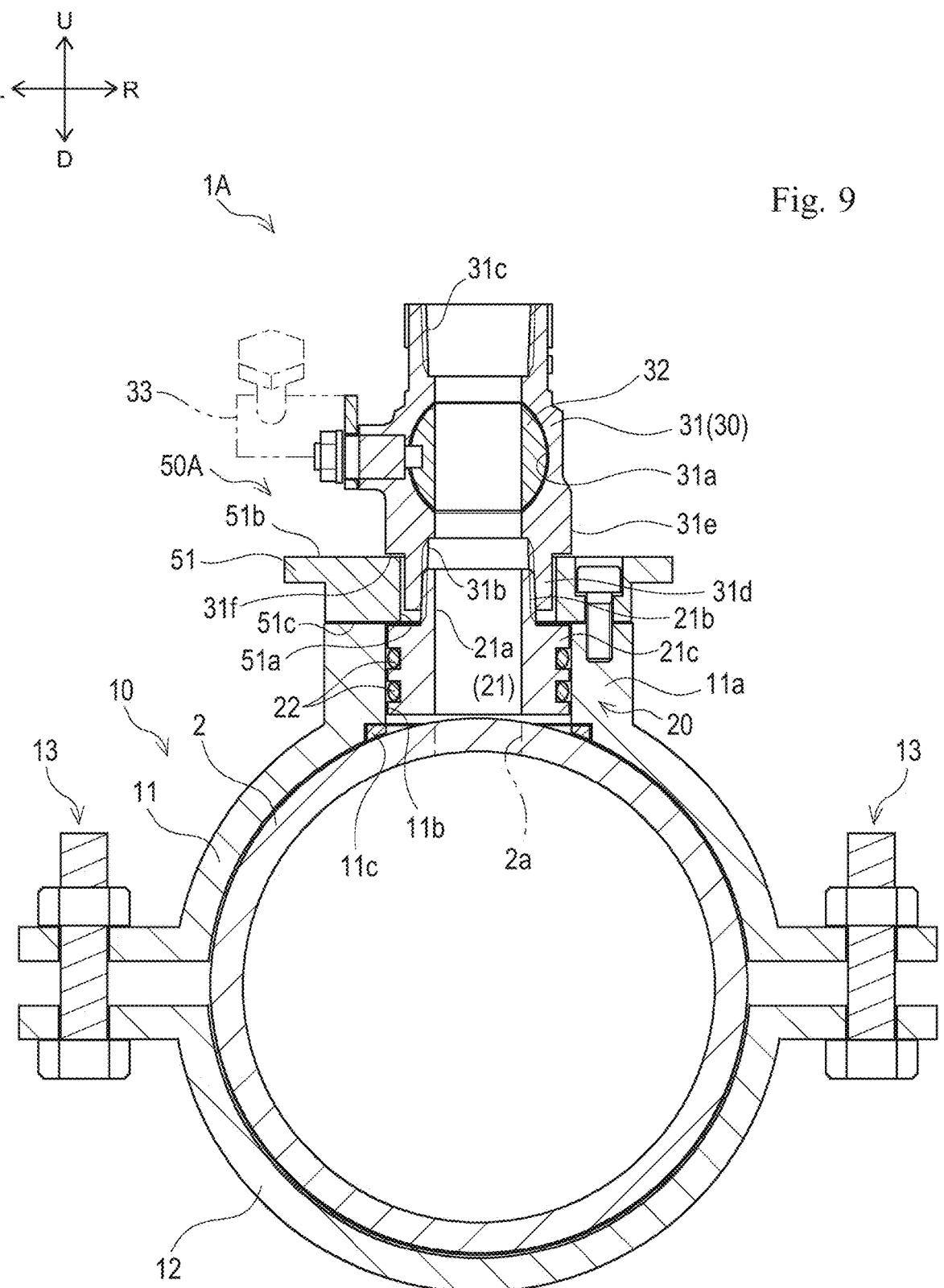
FIG. 9 is a front cross-sectional view illustrating an attachment device and a water pipe according to a second example embodiment of the present disclosure.

An attachment device 1A according to a second example embodiment of the present invention illustrated in FIG. 9 is different from the first example embodiment in that an upper valve connection portion 40, a second attachment portion 52, and a cover portion 60 are not provided. In the attachment device 1A, a valve portion 30 is disposed so as to be substantially entirely exposed. Note that an appropriate lid may be provided so as to close an upper end portion of a through hole 31a of the valve portion 30. Furthermore, in the attachment device 1A, a drilling machine 70 and an information acquisition device 80 may be directly attached to a first attachment portion 51.

The attachment device 1A as described above also achieves effects substantially similar to those of the first example embodiment. Furthermore, according to the attachment device 1A as described above, the number of structural elements can be reduced, and the configuration of the device can be simplified.

Figure 10:
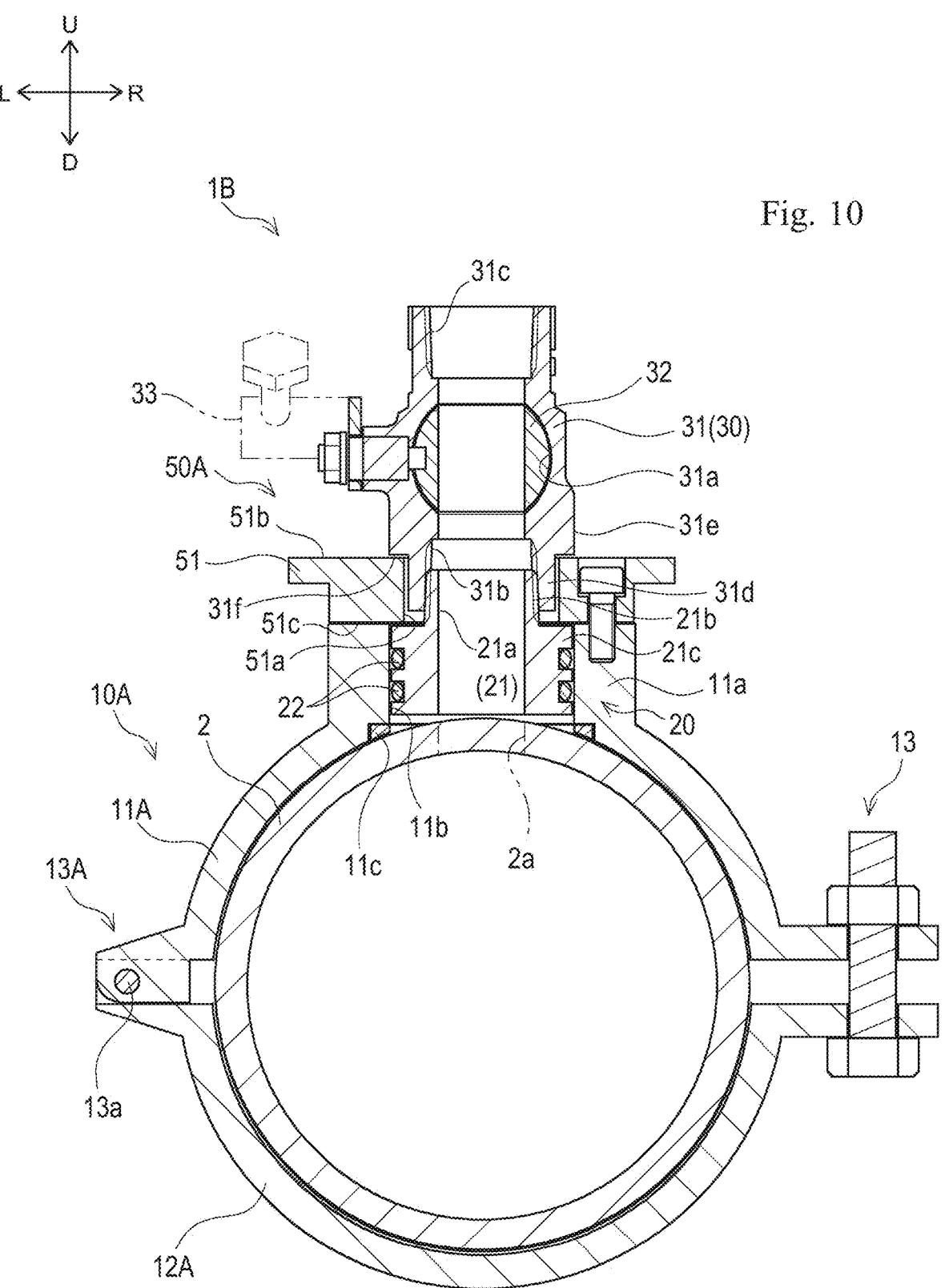
FIG. 10 is a front cross-sectional view illustrating an attachment device and a water pipe according to a third example embodiment of the present disclosure.

An attachment device 1B according to a third example embodiment of the present invention illustrated in FIG. 10 is different from the attachment device 1A according to the second example embodiment in the configuration of a pipe attachment portion 10A.

In the pipe attachment portion 10A of the attachment device 1B, first end sides in the left-right direction of an upper portion 11 and a lower portion 12 are coupled by a coupling portion 13A having a rotation shaft 13a facing the front-back direction instead of a bolt and a nut. In the pipe attachment portion 10A, the upper portion 11 and the lower portion 12 are rotatably coupled around the rotation shaft 13a.

When the pipe attachment portion 10A is attached to a water pipe 2, the water pipe 2 is vertically sandwiched by rotating the upper portion 11 and the lower portion 12 around the rotation shaft 13a, and second end sides in the left-right direction of the upper portion 11 and the lower portion 12 are fixed using a coupling portion 13 (bolt and nut).

The attachment device 1B as described above also achieves effects substantially similar to those of the second example embodiment. Furthermore, according to the attachment device 1B as described above, the number of fixing locations using bolts and nuts can be reduced, and the workability of attachment of the pipe attachment portion 10A to the water pipe 2 can be improved.

Figure 11:
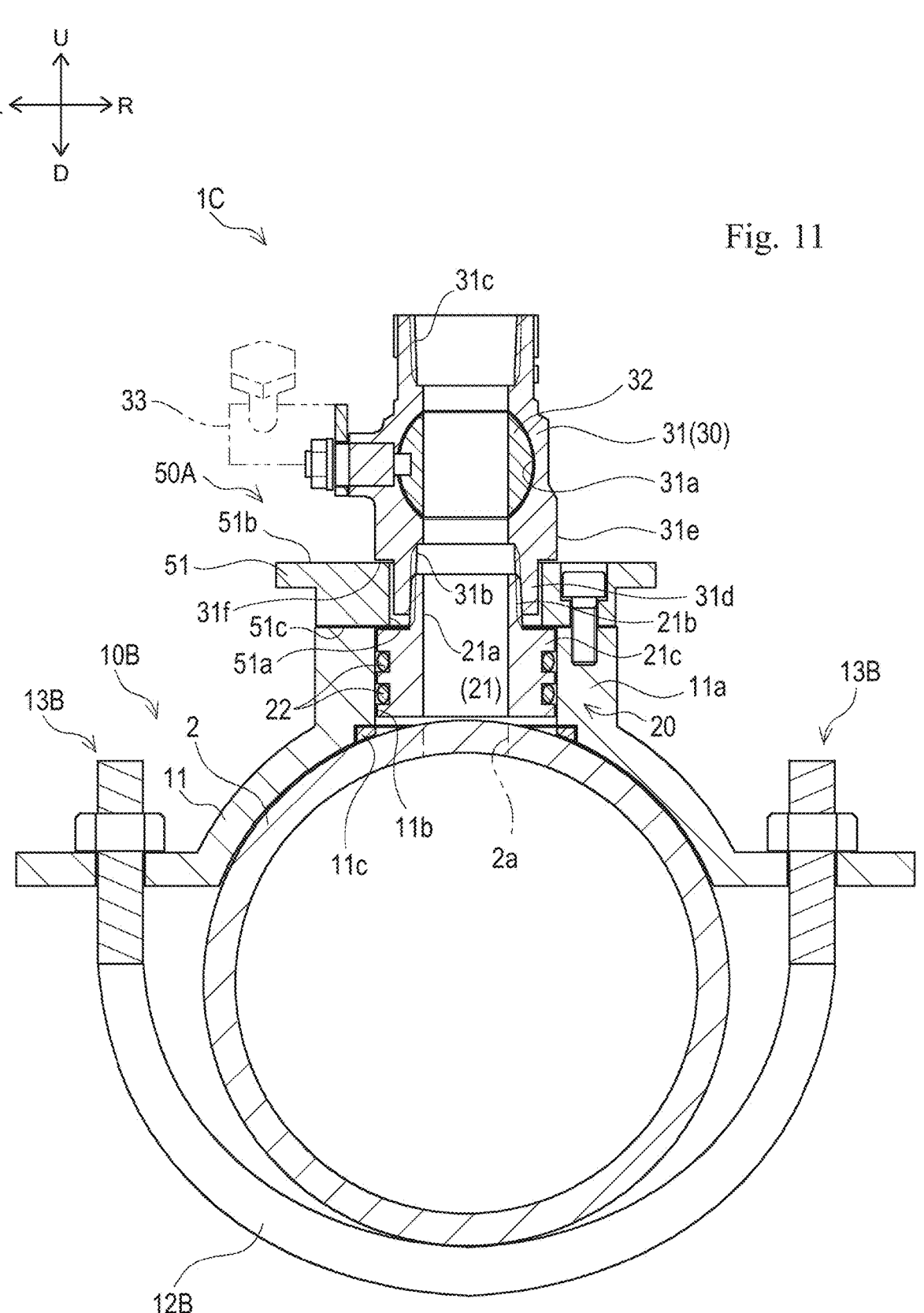
FIG. 11 is a front cross-sectional view illustrating an attachment device and a water pipe according to a fourth example embodiment of the present disclosure.

An attachment device 1C according to a fourth example embodiment of the present invention illustrated in FIG. 11 is different from the attachment device 1A according to the second example embodiment in the configuration of a lower portion 12B of a pipe attachment portion 10B.

In the present example embodiment, the lower portion 12B includes a U-shaped bolt instead of a substantially half cylindrical structure substantially similar to an upper portion 11. Both end portions of the lower portion 12B are subjected to screw processing. As the lower portion 12B, an existing U-shaped bolt can be used.

When the pipe attachment portion 10B is attached to a water pipe 2, if both end portions of the lower portion 12B are inserted into the upper portion 11 so as to sandwich the water pipe 2 vertically, coupling portions 13B (nuts) are mainly fitted to both end portions of the lower portion 12B.

The attachment device 1C as described above also achieves effects substantially similar to those of the second example embodiment. Furthermore, according to the attachment device 1C as described above, the pipe attachment portion 10B can be attached to the water pipe 2 using the existing U-shaped bolt.

Although example embodiments of the present invention have been described above, the present invention is not limited to the above configurations, and various modifications can be made within the scope of the invention described in the claims.

For example, in the present example embodiment, an example has been described in which the elastic structure (O-ring 22) seals between the valve connection portion (lower valve connection portion 20) and the opening 11b of the pipe attachment portion 10, but the present invention is not limited to such an example embodiment. For example, the valve connection portion (lower valve connection portion 20) and the opening 11b of the pipe attachment portion 10 may be subjected to screw processing and fitted to each other to stop water.

Furthermore, in the present example embodiment, the information acquirer 84 may preferably include the strain gauge on the surface of the plate-shaped body, but is not limited to such an example embodiment. Any configuration can be adopted as the information acquirer 84.

Furthermore, in the present example embodiment, the information acquirer 84 (information acquisition device 80) detects the flow velocity of water in the water pipe 2, but the present invention is not limited to such an example embodiment. For example, the information acquirer 84 may acquire various other information such as pressure, temperature, vibration, an image (video), and turbidity in the pipe.

Here, in the case of acquiring the temperature, the image (video), and the turbidity in the pipe, a thermometer, a camera, or a turbidity meter may be used at a tip of the shaft portion 82 instead of or in addition to the information acquirer 84 according to the present example embodiment. Furthermore, in a case where the pressure in the pipe is acquired, for example, a through hole through which the pressure in the pipe can be extracted may be provided in the shaft portion 82, and an appropriate pressure sensor may be provided in the through hole. Furthermore, a pressure sensor may be directly provided in the attachment device 1 without providing the shaft portion 82. In this case, the pressure in the pipe extracted through each through hole (opening 11*b*, through hole 21*a*, through hole 31*a*, and through hole 41*a*) of the attachment device 1 may be acquired by the pressure sensor.

Furthermore, in the present example embodiment, an example in which the pipe attachment portions 10, 10A, and 10B each being divided into two portions are formed using the upper portions 11 and 11A and the lower portions 12, 12A, and 12B each having a substantially semicircular shape (substantially half cylindrical shape or U-shape) in front view has been described, but the present invention is not limited to such an example embodiment. For example, the pipe attachment portions 10, 10A, and 10B each being divided into three or more portions may be formed using structures obtained by dividing a cylinder into three or more portions (for example, equally).

Furthermore, in the present example embodiment, an example in which the water pipe 2 is adopted as the pipe on which the attachment devices 1 to 1C are installed has been described, but the present invention is not limited to such an example embodiment. The attachment devices 1 to 1C can be installed in various pipes (pipelines) through which a fluid flows, such as other metal pipes and pipes (resin pipes) made of resin.

Example embodiments of the present invention can be applied to attachment devices each capable of attaching an information acquisition device that acquires information regarding a pipe through which a fluid flows, and attachment methods of the information acquisition devices.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An attachment device that is capable of forming a first through hole in an outer peripheral surface of a pipe using a drilling machine and attaches an information acquisition device to acquire information regarding the pipe through the first through hole, the attachment device comprising:

a pipe attachment portion attachable to the pipe and including an opening communicating with the first through hole;

a valve portion attached so as to communicate with the opening;

a first valve connection portion connecting the opening and the valve portion;

an attachment portion to which the drilling machine or the information acquisition device can be attached; and a second valve connection portion connecting the valve portion and the drilling machine or the information acquisition device; wherein the second valve connection portion includes:

a first main body that is tubular and insertable into a second through hole in the valve portion and the drilling machine or the information acquisition device; and a first elastic portion on an outer peripheral surface of the first main body to seal between the outer peripheral surface of the first main body and an inner peripheral surface of the second through hole; and the first main body is connectable to the drilling machine or the information acquisition device by being inserted into the second through hole so as to be pushed against a frictional force of the first elastic portion.

2. The attachment device according to claim 1, wherein the first valve connection portion includes:

a second main body that is tubular; and a second elastic portion on an outer peripheral surface of the second main body to seal between the outer peripheral surface of the second main body and an inner peripheral surface of the opening.

3. The attachment device according to claim 1, wherein the attachment portion includes an abutment portion to abut against the valve portion on a plane orthogonal to a central axis of the opening.

4. The attachment device according to claim 1, wherein the information acquisition device includes:

an information acquirer to acquire information regarding the pipe;

a shaft portion to which the information acquirer is attachable; and an operator to insert the shaft portion into the first through hole.

5. An attachment method of an information acquisition device using the attachment device according to claim 1, the attachment method comprising:

attaching the drilling machine to the attachment device attached to the pipe;

forming the first through hole in the pipe using the drilling machine after the attaching the drilling machine; and detaching the drilling machine from the attachment device and attaching the information acquisition device to the attachment device after the forming the first through hole.

6. An attachment method of an information acquisition device using the attachment device according to claim 2, the attachment method comprising:

attaching the drilling machine to the attachment device attached to the pipe;

forming the first through hole in the pipe using the drilling machine after the attaching the drilling machine; and detaching the drilling machine from the attachment device and attaching the information acquisition device to the attachment device after the forming the first through hole.

7. An attachment method of an information acquisition device using the attachment device according to claim 3, the attachment method comprising:

attaching the drilling machine to the attachment device attached to the pipe;

forming the first through hole in the pipe using the drilling machine after the attaching the drilling machine; and detaching the drilling machine from the attachment device and attaching the information acquisition device to the attachment device after the forming the first through hole.

8. An attachment method of an information acquisition device using the attachment device according to claim 4, the attachment method comprising:

attaching the drilling machine to the attachment device attached to the pipe;

forming the first through hole in the pipe using the drilling machine after the attaching the drilling machine; and detaching the drilling machine from the attachment device and attaching the information acquisition device to the attachment device after the forming the first through hole.

* * * * *